United States Patent [19]

Kurz et al.

[11] Patent Number: 5,612,138
[45] Date of Patent: Mar. 18, 1997

[54] POLYESTER RAW MATERIAL, AND FILM PRODUCED THEREFROM

[75] Inventors: Rainer Kurz, Taunusstein; Andreas Ferdinand; Hermann Dallmann, both of Wiesbaden, all of Germany

[73] Assignee: Hoechst Aktiengesellschaft, Frankfurt, Germany

[21] Appl. No.: 438,208

[22] Filed: May 9, 1995

Related U.S. Application Data

[62] Division of Ser. No. 228,204, Apr. 15, 1994, Pat. No. 5,478,632.

[30] Foreign Application Priority Data

Apr. 24, 1993 [DE] Germany .......... 43 13 510.2

[51] Int. Cl.$^6$ ...................... B32B 9/04
[52] U.S. Cl. ................. 428/411.1; 428/323; 428/327; 428/330; 428/331; 428/338; 428/339; 428/480
[58] Field of Search ............... 428/195, 212, 428/304.4, 323, 411.1, 402, 480, 484, 688, 327, 330, 331, 338, 339

[56] References Cited

U.S. PATENT DOCUMENTS 3,980,611  9/1976  Anderson et al. ............ 260/40 R
5,316,714  5/1994  Yoneda et al. ............... 264/210.6

FOREIGN PATENT DOCUMENTS 0236948  9/1987  European Pat. Off. .
0257611  3/1988  European Pat. Off. .
0261430  3/1988  European Pat. Off. .
0262430  4/1988  European Pat. Off. .
0423402  4/1991  European Pat. Off. .

OTHER PUBLICATIONS

Chemical Abstracts, vol. 110, No. 16, Apr. 17, 1989, abstract of JP-A-63 235 336, published Sep. 30, 1988.
Chemical Abstracts, vol. 110, No. 14, Apr. 3, 1989, abstract of JP-A-63 238136, published Oct. 4, 1988.

*Primary Examiner*—William Krynski
*Attorney, Agent, or Firm*—Foley & Lardner

[57] ABSTRACT

The invention describes a novel polyester raw material and the production and use of an oriented, single- or multilayer film having an overall thickness of $\leq 4$ μm and a roughness on at least one film surface of $R_a < 30$ nm, where the surface gas-flow resistance on at least one film surface is $$t \leq a \cdot d^b [\text{sec}],$$

where $a=0$ to 10,000 [sec/μm], $b=3.0$ to $\sigma$, and $d$ (overall film thickness) $\leq 4$ μm. The film contains first (I) and second (II) particles. The first particles are monodisperse and have an aspect ratio of 1.0–1.2.

13 Claims, No Drawings

POLYESTER RAW MATERIAL, AND FILM PRODUCED THEREFROM

This application is a division of application Ser. No. 08/228,204, filed Apr. 15, 1994, now U.S. Pat. No. 5,478,632.

BACKGROUND OF THE INVENTION

1. Field of the Invention

The present invention relates to a polyester raw material, and more particularly to a polyethylene terephthalate raw material (PET raw material), which contains finely divided, disperse, inorganic and/or organic particles. The invention further relates to films produced therefrom which have improved winding properties and are therefore more suitable than conventional films for use as capacitor films.

2. Description of Related Art

Thinner and smoother films are in demand as dielectrics, particularly for use in capacitors, in order to reduce the physical size of capacitors or to increase the capacitance. However, the processing of ever thinner, conventionally stretched films increasingly causes the problem that irreversible film defects, such as the formation of folds and stretches, occur in the various processing steps, such as winding, metallization, cutting and capacitor winding. In order for the films to be processed without folding and stretching, they require adequate slip, which prevents the films from blocking in the individual process steps, and also a surface topography which enables the air between the individual film layers in the winding to escape sufficiently quickly. Attempted film processing solutions, such as increasing winding tensions, are only of limited practicability in ultra-thin films, since an increase in the winding tension can result in irreversible film defects, such as stretching.

It is known from U.S. Pat. No. 3,980,611 that a combination of small, medium-size and large particles can improve film handling, depending on the film thickness. U.S. Pat. No. 3,980,611 achieves this by a combination of large (2.5–10 μm) particles with medium-size (1–2.5 μm) and small (<1 μm) particles, where the following relationship must be satisfied:

| | |
|---|---|
| $C_1 =$ | $K_{large}/T^{0.6}$ |
| $C_2 =$ | $K_{medium}/T^{0.6}$ |
| $C_3 =$ | $K_{small}/T^{0.6}$ |
| $K =$ | $K_{large} + K_{medium} + K_{small} \leq 2510$ |
| $K_{medium}/K \approx$ | 0.3 |
| $T =$ | film thickness (here in the range from 0.1 to 3 μm) |
| $K_{large, medium, small} =$ | empirical constants<br>$K_{large}$ 97–500<br>$K_{medium}$ <200<br>$K_{small}$ 194–2000 |
| $C_{1,2,3} =$ | concentration in parts per million |

These ultra-thin films have the disadvantage of a relatively high content of large particles having a particle size from 2.5 to 10 μm. For a film thickness of 3 μm to 1 μm or less, these large particles can become nominal breaking points during the production process. In addition, they represent weak points with regard to electrical insulation. A further disadvantage is regarded as being the fact that the relatively high roughness or the high surface elevations caused by the large particles, causes a low capacitance per unit volume in the capacitor.

It is known from EP-A-0 423 402 that films having a thickness in the range from 0.1 to 4 μm can be produced by the addition of inert, secondary-agglomerated, inorganic particles having a particle diameter from 0.05 to 5 μm and a primary, spherical particle (i.e. one having an aspect ratio of from 1.0 to 1.2) having a particle diameter of from 0.05 to 4 μm. The secondary-agglomerated particles are, in contrast to primary particles, smaller particles which group together in the polymer and emulate the action of a larger particle. For secondary-agglomerated particles, the mean particle diameter data is related to the size of the agglomerates and not to the size of the smaller particles. The term inert is taken to mean that the particles do not react with the polymer raw material under the process and processing conditions. Spherical means that the particles come very close to the idealized spherical shape. A measure thereof is the aspect ratio, which is the quotient of the largest and smallest diameters, which is 1 in the case of a perfect sphere.

In the case of either a combination of inert, secondary-agglomerated particles with larger, inert, inorganic or organic particles, or in the case of spherical particles, relatively large particles are employed relative to the desired film thickness of $\leq 2$ μm. Although the addition of the particles simplifies winding of the films or makes winding possible at all, the large particles in these combinations can again represent nominal breaking points during film production and weak points with respect to electrical insulation.

These spherical particles used in the preparation of raw materials and the production of films is likewise described in EP-A-0 236 948, EP-A-0 262 430 and EP-A-0 257 611. However, these applications do not teach the topography required of an ultra-thin film to allow processing without the stated problems of folding and stretching.

Our own experiments have shown that a reduction in the film thickness for the same raw material formulation, i.e., the same chemical composition, makes winding of films more difficult. This is due to the fact that the air trapped between the film layers, which must escape from the winding in the shortest possible time, causes increased irreversible stretching with decreasing film thickness. This irreversible stretching is due to bubble formation caused by trapped air. A measure of the tendency of the film to form such winding defects is the surface gas-flow resistance. This is defined as the time required by air to compensate for a pressure difference between a film and a glass plate. This parameter allows determination of the speed, and therefore the time, with which the air trapped between the individual film layers can escape from the winding. Our own investigations have shown that, for a constant chemical composition of the film, the surface gas-flow resistance depends primarily on the film thickness and film roughness. For example, the surface gas-flow time of a polyethylene terephthalate (PET) raw material containing 1000 ppm of an inert, secondary-agglomerated, inorganic particle having a particle diameter of 0.005 to 4 μm and 1000 ppm of a further inert, inorganic particle having a particle diameter of 0.05 to 5 μm, is shown in Table 1 for film thicknesses of 1.8 to 10 μm.

TABLE 1

| Film thickness (μm) | Gas-flow time measured (sec) | Gas-flow time calculated[1] (sec) | Roughness $R_a$ (nm) | Roughness $R_z$ (nm) | Winding[2] |
|---|---|---|---|---|---|
| 10 | 70 ± 20 | 64 | — | — | + |
| 9 | — | 81 | — | — | + |
| 8 | — | 104 | — | — | + |
| 7 | 130 ± 50 | 140 | — | — | + |
| 6 | 180 ± 50 | 196 | 51 ± 8 | 569 ± 130 | + |
| 5 | 260 ± 50 | 292 | 46 ± 8 | 515 ± 130 | + |
| 4 | — | 475 | — | — | + |
| 3 | 1,180 ± 150 | 889 | 45 ± 8 | 484 ± 130 | + |
| 2.5 | 1,420 ± 150 | 1,324 | 39 ± 8 | 441 ± 130 | + |
| 2 | 2,220 ± 200 | 2,156 | 36 ± 8 | 403 ± 130 | − |
| 1.8 | 2,250 ± 200 | 2,713 | 34 ± 8 | 384 ± 130 | − |

[1]Calculated Gas-flow time $t = a \cdot d^b$ [sec],
where  a = 9792 [sec/μm]
       b = −2.18335
       d = film thickness [μm]
Parameters (a) and (b) were determined empirically.
[2]Winding (+) = films could be wound without folding and stretching
        (−) = folds and stretching occurred during winding It can be seen from Table 1 that the surface gas-flow times increase, i.e. the risk of air inclusions and thus of irreversible stretching increases, with decreasing film thickness.

The dependence of the surface gas-flow time on the thickness of ultra-thin capacitor films is shown in illustrative terms in Table 2 for some films having thicknesses of 1.2 to 3 μm (these had different empirical constants than the thicker films in Table 1).

TABLE 2

| Film thickness (μm) | Gas-flow time measured (sec) | Gas-flow time calculated[1] (sec) | Roughness $R_a$ (nm) | Roughness $R_z$ (nm) | Winding[2] |
|---|---|---|---|---|---|
| 3 | 900 ± 150 | 898 | 43 ± 8 | 468 ± 130 | + |
| 2.5 | 1,050 ± 150 | 1,081 | 42 ± 8 | 436 ± 130 | + |
| 2 | 1,250 ± 100 | 1,355 | 36 ± 8 | 383 ± 130 | + |
| 1.5 | 2,000 ± 200 | 1,815 | 35 ± 8 | 378 ± 130 | + |
| 1.2 | 2,300 ± 200 | 2,276 | 34 ± 8 | 310 ± 130 | + |

[1]Gas-flow time $t = a \cdot d^b$ [sec],
where  a = 2,739 [sec/μm]
       b = −1.01479
       d = film thickness [μm]
[2]Winding (+) = films could be wound without folding and stretching
        (−) = folds and stretching occurred during winding Given the above-mentioned relationship between film thickness and gas-flow time, it is not surprising that currently commercially available ultra-thin capacitor films such as Lumirror® C60, Mylar® C or Hostaphan® have comparable surface gas-flow times for the same thicknesses (see Table 3a).

TABLE 3a

| Film type | Film thickness (μm) | Gas-flow time measured (sec) | $R_a$ (nm) | $R_z$ (nm) |
|---|---|---|---|---|
| Lumirror® C60 | 2.0 | 1,200 ± 150 | 41 ± 8 | 390 ± 130 |
| Mylar® C. | 2.0 | 900 ± 150 | 30 ± 8 | 370 ± 130 |
| Hostaphan® | 2.0 | 1,250 ± 150 | 36 ± 8 | 380 ± 130 |

The Hostaphan and Lumirror films which have very similar gas flow times also have very similar roughness values (see Table 3a) and peak height distribution value (see Table 3b). When compared with these films, the roughness value for the Mylar film is lower.

TABLE 3b

| Film type | Total number of peaks 0.36 mm² | Surface elevations having a certain peak height | | |
|---|---|---|---|---|
| | | 0.05–0.3 μm/ 0.36 mm² | 0.3–0.6 μm/ 0.36 mm² | 0.6–1 μm/ 0.36 mm² |
| Lumirror® C60 | 15,201 ± 2000 | 14,636 ± 1,970 | 513 ± 70 | 52 ± 20 |
| Mylar® C | 7,453 ± 2000 | 6,903 ± 1,970 | 448 ± 70 | 102 ± 20 |
| Hostaphan® | 11,932 ± 2000 | 11,681 ± 1,970 | 204 ± 70 | 47 ± 20 |

Nevertheless despite the lower roughness value, the Mylar film is found to have a comparable gas-flow time to Hostaphan and Lumirror. This time is achieved through a higher proportion of high film elevations (0.6–1.0 μm), caused by a correspondingly large particle (see in this respect U.S. Pat. No. 3,980,611), than in Hostaphan and Lumirror. However, large particles have the above-mentioned disadvantages of nominal breaking points and electrical defects.

Although films having a thickness of 2 μm and a mean roughness of 30 nm are known (see Tables 3a and 3b), these films have some high peaks in the surface elevations in the range from 0.6 to 1 μm, which are disadvantageous. These peaks are caused by particles whose particle diameter is in some cases significantly greater than the thickness of the film. As discussed above, such large particles are disadvantageous in films having a thickness of ≦2 μm since tears occur during film production. Very large particles can also have a disadvantageous effect on the frequency of electrical defects, i.e. they can cause an increased number of dielectric breakdowns. The relatively large number of large film elevations is undoubtedly the reason why the films having a mean roughness of 30 nm also have a satisfactory surface gas-flow resistance and accordingly can be produced and processed further without problems (folds and stretching). However, this is at the expense of a reduced capacitance in the capacitor (larger layer separation in the winding).

SUMMARY OF THE INVENTION

One object of the present invention is to keep the film thickness as small as possible (ultra-thin films) and at the same time to suppress the occurrence of winding defects, such as irreversible stretching to the greatest possible extent.

A film of this type should have adequate slip over all the process steps to prevent blocking.

Another object of the present invention is to provide a film raw material which is used to fabricate the defect free ultra-thin films.

In accomplishing the foregoing objects, there has been provided according to one aspect of the present invention, an oriented, single or multilayer film comprising a film having a total thickness of $\leq$ about 4 µm, a roughness on at least one film surface of $R_a<$ about 30 nm, and a surface gas-flow resistance on the at least one film surface that satisfies the relationship $$t \leq a \cdot d^b [\sec],$$

where a=0 to 10,000 [sec/µm], b=−3.0 to 0 and d is overall film thickness.

In preferred embodiment, the film contains first particles (I) having an aspect ratio of about 1 to 1.2 and second particles (II) having an aspect ratio of >about 1.2. Preferably, the first particles (I) have a monodisperse distribution.

In another preferred embodiment, the mean particle diameter of the second particles (II) is greater than the particle diameter of the first particles (I).

Another aspect of the present invention provides a film raw material comprising one or more thermoplastic polymers and particulate material, wherein the particulate material comprises first particles (I) having an aspect ratio of about 1 to 1.2 and second particles (II) having an aspect ratio of>about 1.2. Preferably, the first particles (I) have a monodisperse distribution and the mean particle diameter of the second particles (II) is greater than the particle diameter of the first particles (I).

Further objects, features and advantages of the present invention will become apparent from the detailed description of preferred embodiments which follows.

DETAILED DESCRIPTION OF THE PREFERRED EMBODIMENTS

The objects of the present invention are achieved by a film having a thickness of about 0.1 to 4 µm, preferably about 2 µm or less, and a roughness $R_a$ of about 30 nm, where the peak height distribution of the surface elevations causing roughness per 0.36 mm² has only a minimal number (<100) of peak heights from about 0.6 to 1 µm or larger, or none at all. The film has a surface gas-flow resistance of about $t \leq a \cdot d^b$ where a=about 0 to 10,000, preferably about 1 to 3000, more preferably about 2700, b=about −3.0 to 0, preferably about −1.5 to −0.5, particularly about −1, and d$\leq$about 4 µm.

The ultra-thin films according to the present invention which have roughness values of less than 30 nm and surface gas-flow resistance values $t \leq a \cdot d^b$, with the above-mentioned values for a, b and d, can be produced from a film raw material which contains, in addition to the thermoplastic polymer, essentially only primary, spherical and preferably monodisperse first particles (I) and inorganic or organic second particles (II). The particle diameter of the spherical and preferably monodisperse primary particle (I) is smaller than the mean particle diameter of the inorganic or organic particles (II). Films made from a raw material of this type can be processed without folding and stretching.

The particles (I) are spherical, i.e. they have an aspect ratio from about 1 to 1.2. "Aspect ratio" is the quotient of the largest and smallest particle diameters. In the ideal case, this is equal to 1. The aspect ratio values are measured on particles in a finished film and accordingly do not relate to the aspect ratio values of the free particles. The particles (I) preferably have a particle diameter of about 0.05 to 2.5 µm, more preferably from about 0.05 to 1 µm. "Monodisperse" here means that the particles have a very narrow particle size distribution. In the ideal case there is no distribution. In this ideal case, there is no longer a mean particle size, since all particles have virtually the same diameter. The monodisperse particles (I) preferably employed according to the invention differ from the mean particle size by a maximum of about 0.5 µm, preferably by a maximum of about 0.1 µm. Under these prerequisites, the standard deviation over the mean distribution of the particles is <about 0.5 µm, preferably <about 0.1 µm. Particles (I) are preferably silicon dioxide particles, silicone particles, calcium carbonate particles, crosslinked polystyrene particles, crosslinked epoxy resin particles or crosslinked acrylate particles. These particles (I) are referred to below as "small particles". The particle diameter of these small particles (I) and the aspect ratio and monodispersity can be determined by measuring electron photomicrographs at a magnification from 3000 to 10,000.

The organic or inorganic particles (II) can be either spherical (aspect ratio about 1 to 1.2) or aspherical (aspect ratio>about 1.2) and have a mean particle diameter which is greater than that of the small particles (I), preferably from about 0.05 to 2.5 µm, more preferably from about 0.5 to 2.5 µm. The aspect ratio of these particles is preferably >about 1.2, more preferably from about 1.2 to 5. The extent of the particle size distribution of particles (II) is not crucial, but particles having a distribution, i.e. non-monodisperse particles, are preferred. The mean particle diameter of the inorganic or organic particles (II) can be determined by means of a laser light diffraction particle analyzer (for example a Horiba LA 500). The cumulative curve of the particle size distribution allows the mean particle diameter to be determined as the value for which 50% by the weight of the particles are larger and 50% by weight of the particles are smaller.

Particles (II) can be inorganic particles, for example, made from kaolin, aluminum oxide, silicon dioxide, amorphous silicic acid, pyrogenic silicic acid, or natural or precipitated calcium carbonate. The particles can also be organic particles, for example, made from silicones, acrylates or epoxy resin compounds. These particles (II) are referred to below as "medium particles". Both the particles (I) and the particles (II) are commercially available.

"Large" particles having a mean particle diameter of >2.5 µm are not present in the films or raw materials according to the present invention.

Use of the medium and small particles (I) and (II) enables the film roughness to be reduced, but nevertheless ensures that the films can be processed without folding and stretching. In other words, this means that films having a surface flow resistance t of less than $a \cdot d^b$ (where a and b are as defined above) can be processed without the problems of the known art.

According to the present invention, the raw material contains from about 0.005 to 5.0% by weight of particles of types (I) and (II) (this figure corresponds to a sum of particles I and II and is based on the cumulative weight of polymer and particles). Preferably, from about 0.01 to 1.0% by weight of spherical, preferably monodisperse particles (I) and from about 0.01 to 1.0% by weight of inorganic or organic particles (II) are employed.

The polymer material used in the present invention can be a polyester raw material. The term polyester raw materials are defined as compositions containing predominantly, i.e. to at least 80% by weight, preferably at least 90% by weight, a polymer selected from the group consisting of polyethylene terephthalate (PET), polyethylene naphthalate (PEN), poly-1,4-dicylcohexanedimethylene terephthalate (PCT), polyethylene naphthalate dibenzoate (PENBB) and blends of these polymers. Preference is given to polyester raw materials containing essentially ethylene terephthalate units and/or up to 30 mol % comonomeric units, where a variation in the glycol and/or acid components of the comonomer units is possible. The polyesters can be prepared either by the transesterification process using conventional catalysts, such as Zn, Ca, Li and Mn salts, or by the direct esterification process.

The film according to the present invention is produced from a mixture of the thermoplastic polyester raw material containing the spherical, preferably monodisperse particles (I) and the inorganic or organic particles (II).

The polyester raw material can be prepared by addition of the particles before commencement of the transesterification or after completion of the transesterification. The particles are preferably added in the form of a glycolic suspension before completion of the esterification. Alternatively, the particles can be incorporated after preparation of the polyester raw material by blending, compounding, etc.

The polyester films can be produced by known processes which need not be described in greater detail. The polyester films can be produced from the above-described raw materials or from a combination of the above polyester raw materials with further raw materials or conventional additives in conventional amounts from about 0.1 to a maximum of about 10% by weight. The films can either be monofilms or multilayer films. If desired, the multilayer films can be coextruded films having identical or different surfaces. For example, one surface can be pigmented and the other surface can be unpigmented.

A multistep stretching process with high stretching ratios in both surface directions of the film is preferred. In the production of films having a very high level of mechanical properties, the choice of particles incorporated according to the present invention become particularly important. Stretching processes can include sequences such as longitudinal/transverse/longitudinal stretching, simultaneous (longitudinal/transverse) stretching and multiple stretching in one or both directions.

In the examples below, the particles (I) and (II) were added after completion of the transesterification, and the polycondensation was subsequently carried out in the conventional way for PET, so that the polymer has an SV value of 810.

Example A (Comparative example)

4000 ppm of a "small" non-monodisperse, inorganic $SiO_2$ particles (manufacturer: Degussa, Hanau) having a mean particle diameter from 0.3 to 0.4 μm (aspect ratio, measured in the film, >1.2) and 3000 ppm of "medium" particle ($CaCO_3$) (manufacturer: Omya, Cologne) having a mean particle diameter of 1.1 μm were incorporated into polyethylene terephthalate (PET).

Example B 3000 ppm of a "small", spherical (aspect ratio=1), monodisperse $SiO_2$ particle (manufacturer: Merck, Darmstadt) having a particle diameter of 0.4 μm and 3000 ppm of a "medium" particle ($CaCO_3$) having a mean particle diameter of 0.99 μm (aspect ratio>1.2) where incorporated into polyethylene terephthalate (PET).

The PET chips obtained were dried at 160° C. to a residual moisture level of 50 ppm and extruded at from 280° to 310° C. The molten polymer was taken off via a die (die gap 1 mm) over a take-off roll.

The unstretched film was stretched by a factor of 3.8 in the machine direction at 85° to 135° C. and then, in a tenter frame, by a factor of 4.2 in the transverse direction at 85° to 145° C. The film was subsequently set in a further tenter frame at from 180° to 230° C.

The properties of films produced in this way are shown in Tables 4a and 4b below.

TABLE 4a

| Example | Film thickness (μm) | Gas-flow time (sec) | Roughness $R_a$ (nm) | Roughness $R_z$ (nm) | Winding |
|---------|---------------------|---------------------|----------------------|----------------------|---------|
| A | 2.0 | 1200 ± 200 | 26 ± 5 | 262 ± 73 | (−) |
| B | 2.0 | 716 ± 150 | 28 ± 5 | 268 ± 78 | (+) |

TABLE 4b

| Example | Total number of peaks 0.36 mm² | Surface elevations having a certain peak height 0.05–0.3 μm/ 0.36 mm² | 0.3–0.6 μm/ 0.36 mm² | 0.6–1 μm/ 0.36 mm² |
|---------|-------------------------------|-----------------------------------------------------------------------|----------------------|---------------------|
| A | 8926 ± 2000 | 8615 ± 1970 | 266 ± 70 | 45 ± 20 |
| B | 9632 ± 2000 | 8256 ± 1970 | 1300 ± 70 | 76 ± 20 |

In both examples, exclusively "small" and "medium" particles were introduced into the raw materials. However, the use in comparative Example A of only "small" particles having a size distribution (i.e., non-monodisperse) and an aspect ratio of >1.2 makes fold-free winding of the film produced using this raw material impossible.

The $R_a$ values of the two films are below 30 nm. With respect to the surface elevations, the number of peaks for a peak height class from 0.6 to 1.0 μm is less than 100 for both films. However, the film in Example A, in contrast to Example B, was impossible to wind without stretching or folding. This is also expressed in the corresponding surface flow resistances, which are significantly lower for the film in Example B than for Example A.

Although the film in Example A satisfies the equation $t \leq a \cdot d^b$ derived from the films in Table 1, the roughness of film A was 26 nm. This means that smoother films must have shorter gas-flow times than the above equation derived from Table 1 to enable processing without problems. The corresponding better properties are shown through the example of film B.

What is claimed is:

1. An oriented, single or multilayer film comprising a film having a total thickness of ≦about 4 μm, a roughness on at least one film surface of $R_a$<30 nm, and a surface gas-flow resistance (+) on the at least one film surface that satisfies the relationship $$t \leq a \cdot d^b [sec],$$

where a=about 0 to 10,000 [sec/μm], b=about −3.0 to 0 and d is the overall film thickness.

2. An oriented film as claimed in claim 1, wherein at least one surface of the film contains fewer than 100 surface elevations with a peak height of >about 0.6 μm per 0.36 mm².

3. An oriented film as claimed in claim 1, further comprising first particles (I) having an aspect ratio of about 1 to 1.2.

4. An oriented film as claimed in claim 3, wherein the first particles (I) have a monodisperse distribution.

5. An oriented film as claimed in claim 3, wherein the particle diameter of the first particles (I) is from about 0.05 to 2.5 μm.

6. An oriented film as claimed in claim 3, further comprising second particles (II) having an aspect ratio of >about 1.2.

7. An oriented film as claimed in claim 6, wherein the second particles (II) have a mean particle diameter from about 0.05 to 2.5 μm.

8. An oriented film as claimed in claim 6, wherein the mean particle diameter of the second particles (II) is greater than the mean particle diameter of the first particles (I).

9. An oriented film as claimed in claim 3, wherein the first particles (I) have a monodisperse distribution and a mean particle diameter of about 0.05 to 2.5 μm; and wherein the second particles (II) have a mean particle diameter of about 0.05 to 2.5 μm.

10. An oriented film as claimed in claim 1, wherein said film has been biaxially oriented.

11. An oriented film as claimed in claim 1, wherein said film has a single layer.

12. An oriented film as claimed in claim 1, wherein both surfaces of the film have the same topography.

13. An oriented film as claimed in claim 1, wherein the total thickness of the film is from about 0.1 to about 4.0 μm.

* * * * *